(No Model.)
A. N. BEEBE.
COMBINED WEED CUTTER AND LAND LEVELER.
No. 506,764. Patented Oct. 17, 1893.
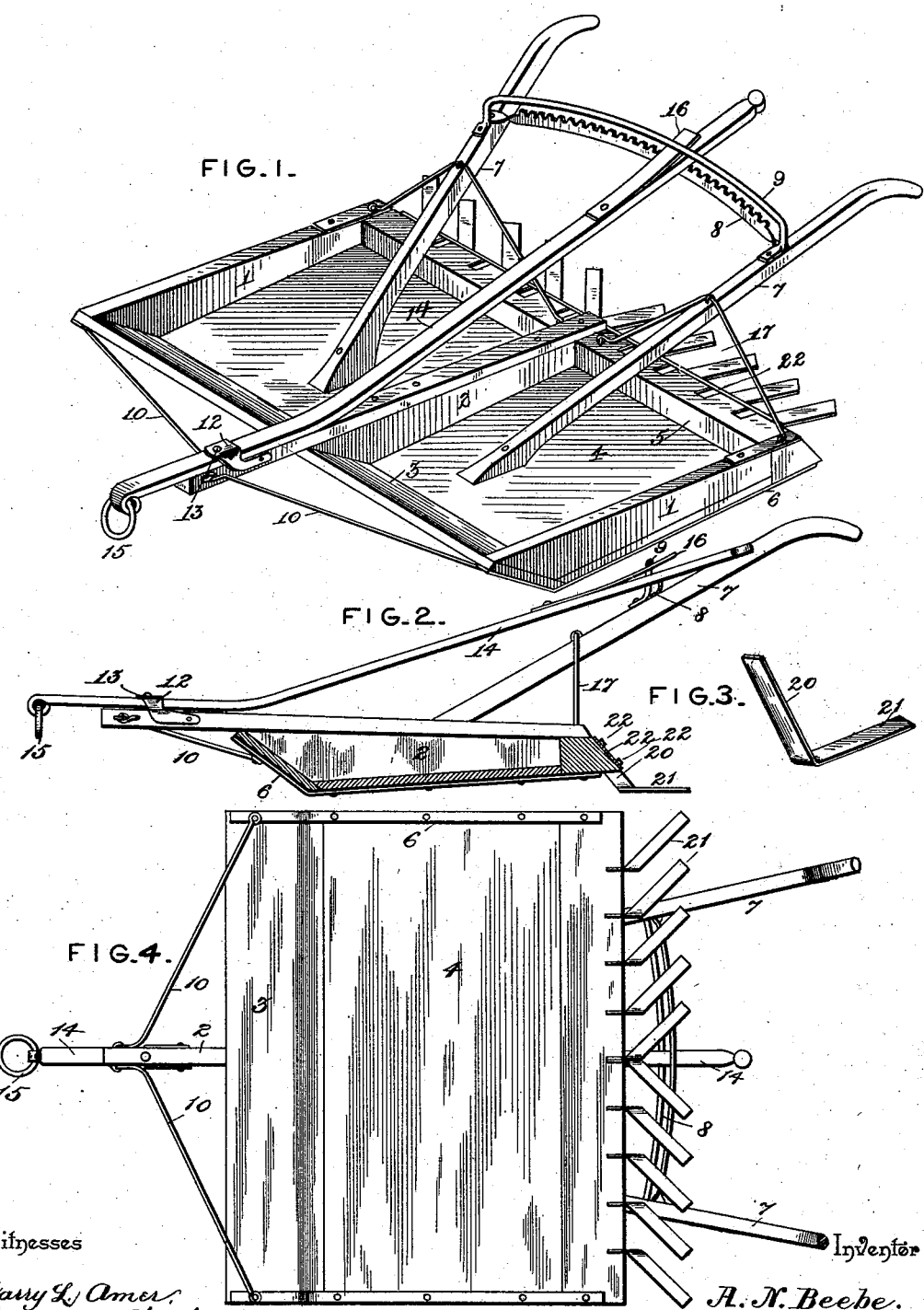

UNITED STATES PATENT OFFICE.

ALVARO N. BEEBE, OF KING CITY, CALIFORNIA.

COMBINED WEED-CUTTER AND LAND-LEVELER.

SPECIFICATION forming part of Letters Patent No. 506,764, dated October 17, 1893.

Application filed December 17, 1892. Serial No. 455,422. (No model.)

*To all whom it may concern:*

Be it known that I, ALVARO N. BEEBE, a citizen of the United States, residing at King City, in the county of Monterey and State of California, have invented a new and useful Combined Weed-Cutter and Land-Leveler, of which the following is a specification.

My invention relates to combined weed-cutters and land-levelers; the objects in view being to produce a handy, convenient machine designed to be drawn over the soil and to penetrate the same destroying all weeds by severing the same at their roots, and at the same time leveling the soil; furthermore, to so construct the device as to render it capable of being readily steered or guided around obstructions, such as trees, &c., it being especially applicable for use in orchards and the like.

With these objects in view the invention consists in certain features of construction hereinafter specified and particularly pointed out in the claims.

Referring to the drawings:—Figure 1 is a perspective view of a combined leveler and weed-cutter embodying my invention. Fig. 2 is a transverse vertical section. Fig. 3 is a detail in perspective of one of the cutters or teeth. Fig. 4 is a bottom plan view.

Like numerals of reference indicate like parts in all the figures of the drawings.

In practicing my invention I employ a pair of opposite side-beams 1 and a central beam 2, which side and central beams rake from their front ends toward their rear ends, or in other words, slightly decline, and at their front corners are beveled or cut away upon their under sides, as shown. The central beam is longer than the beam 1, so that its front beam projects beyond the same and its rear end is recessed, as shown. The three beams are connected at their front beveled edges by an inclined front-board 3 and upon their under edges by a bottom-board 4. At their rear ends they are connected by a transverse bar 5, whose rear side is inclined, as shown. The under side of the bar 5, that of the bottom 4, and that of the board 3 opposite or below the end or side beams 1, are provided with runners 6. From the bottom-board, at opposite sides of the bottom 2 there rise handles 7, the same diverging toward their upper ends and being connected by means of a curved, connected locking-bar 8. The handles are also connected by a transverse guard-rod 9 arranged over the locking-bar 8. Hounds 10 lead from the front ends of the runners to the front extended end of the central beam 2, and the central beam is further provided in rear of the hounds with a substantially U-shaped clip 12, that loosely embraces said bottom. In this clip there is pivoted at 13 a lever 14 whose front end extends beyond that of the central beam and terminates in an eye which carries a draft-ring 15. The rear end of the lever is upwardly-disposed and passes over the locking-bar 8, and between it and the guard-rod 9, is designed upon its under edge to engage removably with the notches in the locking-bar 8, and is provided upon its upper side with a flat spring 16 that rides against the under side of the guard-rod and thus affects the engagement of the lever with the locking-bar. Inclined standards 17 rise from the ends of the transverse bar 5 and aid in securing or bracing the handles in position.

The bar 5 has its rear inclined side provided at intervals with gains or recesses 19, and in each is located and designed to be adjusted the inclined shank 20 of a cutter. The shank about midway its length is bent at an angle so as to produce a rearwardly-disposed diagonal cutting-blade 21, and these blades are disposed in contrary directions at each side of the center of the series, so that the two central blades, the shanks of which are mounted in the same opening or gain, form a V, and those at each side are disposed parallel to that branch of the V to which they are adjacent. The cutters are located some distance below the under side of the leveling-frame, whereby they penetrate the ground and are designed to destroy the roots of weeds, as they are drawn through the same.

The clamping-strip or plate 22 is located across the rear edges of the shanks, said shanks being slightly wider than the gains or seats 19, and therefore extending slightly therefrom. This plate or strip is provided with screws 23 whereby the same may be tightened against the shanks, a pair of screws embracing each shank, preferably in the manner shown. It will be seen that by loosening the screws or bolts the shanks may be raised or lowered, and hence the depth of penetration by the cutters in the soil is regulated.

In operation, the leveler is drawn over the ground, and by reason of its inclined front edge readily rides over ordinary obstructions leaving a smooth, clean surface to the soil and at the same time the cutters or grubbers working in the soil sever the roots of any weeds or undergrowth that may be growing; and furthermore, pulverize or stir up the soil. It will be seen that by lifting upon the handle the cutters may be withdrawn from the ground, and thus raised over any obstacle that would be liable to impair them; and furthermore, that by reason of their diagonal disposition they will readily glide to one side of any ordinary obstructions, such as trash, &c., that may lie in their paths.

Through the medium of the hand-lever, which is in easy reach of the operator, it will be seen that the machine may be guided around trees and other obstructions.

Having described my invention, what I claim is—

1. The combination with a frame comprising a transverse bar having a series of gains or seats formed in its rear face, of a series of cutters horizontally-disposed and provided with upwardly bent shanks seated in said gains and having their rear edges extending therefrom, and a clamping-plate surmounting said rear edges and provided with clamping-bolts passing through the plate and into the bar, substantially as specified.

2. The combination with the framework, comprising a rear transverse bar having an inclined rear edge provided at intervals with gains or recesses, of a series of horizontally and diagonally disposed cutters or blades having shanks at their forward ends upwardly bent taking into the recesses and having their rear edges projecting beyond the same, a clamping-plate surmounting the rear edges, and clamping-bolts for tightening the same against said rear edges, substantially as specified.

3. The combination with the framework, comprising a rear cross-bar having an inclined rear edge provided with gains, a series of shanks located in the gains and secured therein, the central gain having a pair of shanks whose lower ends are bent to form a V-shaped cutter, and the shanks at each side of said central shank being likewise deflected in accordance with the members of the V-shaped cutter adjacent to which they are located to form similarly-disposed cutters, substantially as specified.

In testimony that I claim the foregoing as my own I have hereto affixed my signature in the presence of two witnesses.

ALVARO N. BEEBE.

Witnesses:
   J. J. LONG,
   HENRY ANDERSON.